United States Patent
Druist et al.

(10) Patent No.: US 7,882,618 B2
(45) Date of Patent: Feb. 8, 2011

(54) FABRICATING MAGNETIC READ HEADS WITH A REDUCED SCRATCH EXPOSURE REGION

(75) Inventors: David P. Druist, Santa Clara, CA (US); Mohamad T. Krounbi, San Jose, CA (US); David J. Seagle, Morgan Hill, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 490 days.

(21) Appl. No.: 11/957,468

(22) Filed: Dec. 16, 2007

(65) Prior Publication Data

US 2009/0151151 A1   Jun. 18, 2009

(51) Int. Cl.
*G11B 5/127* (2006.01)
*H04R 31/00* (2006.01)

(52) U.S. Cl. .............. 29/603.16; 29/603.07; 29/603.13; 29/603.14; 29/603.15; 29/603.18; 216/62; 216/65; 216/66; 380/121; 380/122; 380/317; 451/5; 451/41

(58) Field of Classification Search .............. 29/603.07, 29/63.13–63.16, 606.18; 216/62, 65, 66; 360/121, 122, 317; 451/5, 41
See application file for complete search history.

(56) References Cited

U.S. PATENT DOCUMENTS

| | | | |
|---|---|---|---|
| 6,870,717 B2 | 3/2005 | Childress et al. | |
| 6,920,021 B2 | 7/2005 | Mauri et al. | |
| 7,134,182 B2 | 11/2006 | Chang et al. | |
| 7,151,651 B1 | 12/2006 | Cross et al. | |
| 7,161,773 B2 | 1/2007 | Fontana, Jr. et al. | |
| 7,204,014 B2 | 4/2007 | Gill et al. | |
| 2004/0103524 A1 | 6/2004 | Breyta et al. | |
| 2005/0067374 A1 | 3/2005 | Baer et al. | |
| 2005/0122634 A1 | 6/2005 | Childress et al. | |
| 2007/0002502 A1 | 1/2007 | Burbank et al. | |
| 2007/0115595 A1 | 5/2007 | Honda et al. | |
| 2008/0002307 A1* | 1/2008 | Akie .......................... 360/319 |

* cited by examiner

*Primary Examiner*—Paul D Kim
(74) *Attorney, Agent, or Firm*—Duft Bornsen & Fishman, LLP

(57) ABSTRACT

Methods of fabricating magnetic read heads are provided which reduce the width of the scratch exposure region of a read head. During normal fabrication processes, a read head is formed with a first shield, a read element formed on the first shield, and hard bias layers formed on either side of the read element. The width of the read elements and the hard bias layers define an initial scratch exposure region. According to embodiments herein, a mask structure is formed to protect the read element and first portions of the hard bias layers proximate to the read element. A removal process is then performed to remove second portions of the hard bias layers that are not protected by the mask structure, which defines a final scratch exposure region that is smaller than the initial scratch exposure region.

15 Claims, 6 Drawing Sheets

SCRATCH EXPOSURE REGION
130

SCRATCH EXPOSURE REGION
130

SCRATCH EXPOSURE REGION
730

FABRICATING MAGNETIC READ HEADS WITH A REDUCED SCRATCH EXPOSURE REGION

BACKGROUND OF THE INVENTION

1. Field of the Invention

The invention is related to the field of magnetic recording disk drive systems and, in particular, to fabricating a magnetic read heads with a reduced scratch exposure region.

2. Statement of the Problem

Magnetic hard disk drive systems typically include a magnetic disk, a recording head having write and read elements, a suspension arm, and an actuator arm. As the magnetic disk is rotated, air adjacent to the disk surface moves with the disk. This allows the recording head (also referred to as a slider) to fly on an extremely thin cushion of air, generally referred to as an air bearing. When the recording head flies on the air bearing, the actuator arm swings the suspension arm to place the recording head over selected circular tracks on the rotating magnetic disk where signal fields are written to and read by the write and read elements, respectively. The write and read elements are connected to processing circuitry that operates according to a computer program to implement write and read functions.

In a disk drive, particles are often generated within the disk enclosure. Occasionally, these particles are drawn between the magnetic disk and an air bearing surface of the read head. As these particles are squeezed between the read head and the magnetic disk, a small amount of mechanical deformation may occur on the read head. Typically, this mechanical deformation occurs across elements of the read head that are not significantly affected by the deformation. Thus, the mechanical deformation does not affect subsequent performance of the read head. However, if the deformation is across the read gap of the read head where two leads (e.g., two shields) are separated by a very thin insulating gap, then metallic material can be smeared across the read gap. The likelihood of smearing depends on the size of the gap between the two shields. The size of the gap between the shields is often reduced by the addition of hard bias magnets between the shields on either side of the read element. Smears of metallic material between the two shields may permanently degrade the performance of the read head. The area of a read head that is susceptible to smearing between the shields is referred to as the scratch exposure region.

It is therefore desirable to reduce the scratch exposure region so that shorting of the leads is less likely. One way of decreasing the scratch exposure region is to minimize the track width of the read element and to minimize the size of the hard bias magnets on either side of the read element. Unfortunately, there are limitations in present lithographic fabrication processes, such as mask alignment and sizing issues, which restrict decreasing the size of these components during their formation. Thus, it is a problem for manufacturers of read heads to adequately decrease the size of the scratch exposure region of the read heads.

SUMMARY OF THE SOLUTION

Embodiments of the invention solve the above and other related problems with methods of fabricating CPP read heads to reduce the width of the scratch exposure region. During normal fabrication processes, a read head is formed with a first shield, a read element formed on the first shield, and hard bias layers formed on either side of the read element. The width of the read elements and the hard bias layers define an initial scratch exposure region. According to embodiments herein, a mask structure is formed to protect the read element and first portions of the hard bias layers proximate to the read element. A removal process is then performed to remove second portions of the hard bias layers that are not protected by the mask structure. This removal process defines a final scratch exposure region that is smaller than the initial scratch exposure region. Because the final scratch exposure region is reduced, it less likely that there will be a short in the read head due to a scratch.

One embodiment of the invention comprises a method of reducing the scratch exposure region of a read head. The read head includes a first shield, a read element formed on the first shield, and hard bias layers formed on either side of the read element. According to the method, a mask structure is formed to protect the read element and first portions of the hard bias layers proximate to the read element. A removal process is then performed, such as a milling process, to remove second portions of the hard bias layers that are not protected by the mask structure. Insulating material is then deposited and the mask structure is removed. This process results in a read head where the width of the read element and the remaining first portions of the hard bias layers is much less than the width of the read element and the original hard bias layers. The scratch exposure region is thus reduced.

Another embodiment of the invention comprises another method of fabricating a read head. One step of the method includes fabricating a read element and hard bias layers on side regions of the read element. The width of the read element and the hard bias layers define an initial scratch exposure region. Another step includes forming a mask structure on the read element and portions of the hard bias layers proximate to the read element. Another step includes performing a removal process to remove portions of the hard bias layers that are not protected by the mask structure. The width of the read element and the remaining hard bias layers after the removal process define a final scratch exposure region that is smaller than the initial scratch exposure region. Other steps include depositing insulating material, and removing the mask structure.

The invention may include other exemplary embodiments described below.

DESCRIPTION OF THE DRAWINGS

The same reference number represents the same element or same type of element on all drawings.

DETAILED DESCRIPTION OF THE INVENTION

Figure 1:
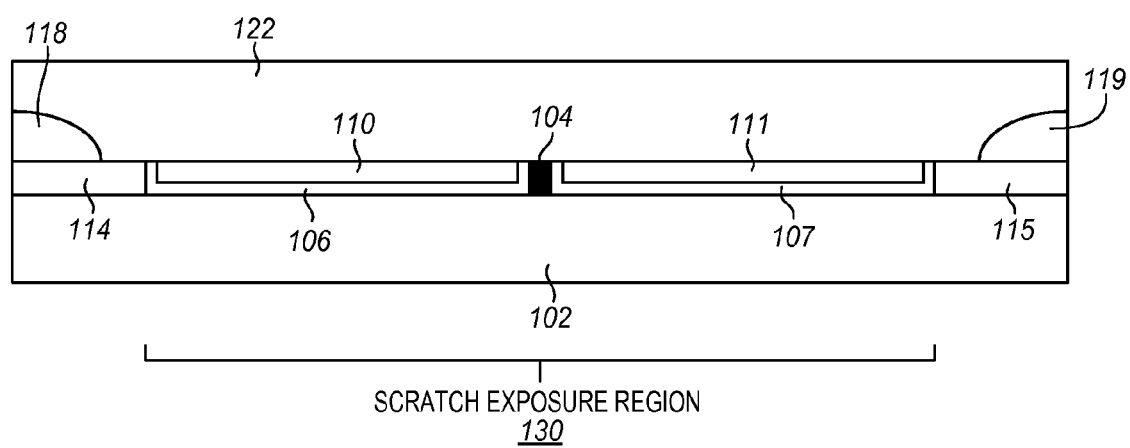
FIG. 1 illustrates a typical CPP read head in the prior art.

FIG. 1 illustrates a typical CPP read head 100. The view in FIG. 1 is from the Air Bearing Surface (ABS) side of read head 100. Read head 100 includes a first shield 102 with a magnetoresistance (MR) read element 104 formed on the first shield 102. Read head 100 further includes hard bias layers 110-111 that are formed on the sides of read element 104. The hard bias layers 110-111 are separated from read element 104 and the first shield 102 by insulating layers 106-107. Read head 100 further includes refill material 114-115 and gap fill material 118-119 on extreme side regions, and a second shield 122. When read head 100 is operated in a CPP fashion, shields 102 and 122 act as leads for read head 100 to allow current to flow through read element 104.

Read head 100 has a scratch exposure region 130 that is especially susceptible to scratches. A scratch exposure region refers to a region or area of a read head where a read element or a hard bias layers are formed between a bottom shield and a top shield. Scratch exposure region 130 is essentially the area between shields 102 and 122 where either hard bias layers 110-111 or read element 104 are formed. In other words, the scratch exposure region 130 is the width from one end of hard bias layer 110 to the other end of hard bias layer 111. In this region, only thin insulating layers 106-107 separate first shield 102 and hard bias layers 110-111. Because insulating layers 106-107 are very thin, it may be easy to scratch metallic material from first shield 102 across insulating layer 106 to contact hard bias layer 110. With hard bias layer 110 being in contact with the second shield 122, this scratch causes a short between the shields 102 and 122.

Figure 2:
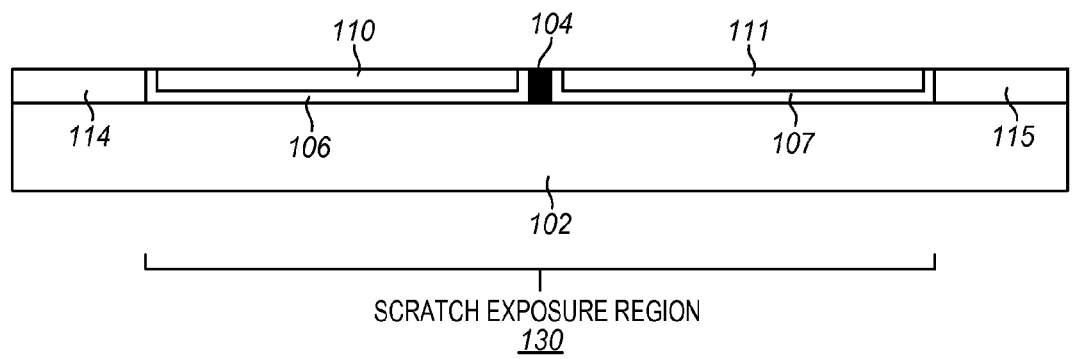
FIG. 2 illustrates a read head during fabrication in the prior art.

FIG. 2 illustrates read head 100 during fabrication. At this point in fabrication, read element 104 is formed on the first shield 102, and hard bias layers 110-111 are formed on side regions of read element 104. Those skilled in the art understand that read head fabrication such as this is typically performed at the wafer level, but an individual read head is shown just for example.

Read head 100 as shown in FIG. 2 may be fabricated according to different fabrication techniques. In one fabrication technique, the first shield 102 is formed and magnetoresistance (MR) layers are deposited on the first shield 102. A first resist is then formed on the MR layers, and the MR layers are milled to remove the excess MR material and to define the stripe height of read element 104. The first resist is then removed. To define the track width of read element 104, a second resist is formed on the MR layers. A milling process is then performed to define the track width of read element 104. Insulating layers 106-107 and hard bias layers 110-111 are then deposited, and the second resist is removed. These fabrication steps result in the structure shown in FIG. 2. Other fabrication processes may also be used to form the resultant structure shown in FIG. 2.

After the track width of read element 104 and the hard bias layers 110-111 are defined, such as in FIG. 2, conventional fabrication processes deposit gap fill material 118-119, and form the second shield 122. Unfortunately, the scratch exposure region 130 may be larger than desired. The following description illustrates how to reduce the scratch exposure region.

FIGS. 3-12 and the following description depict specific exemplary embodiments of the invention to teach those skilled in the art how to male and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 3:
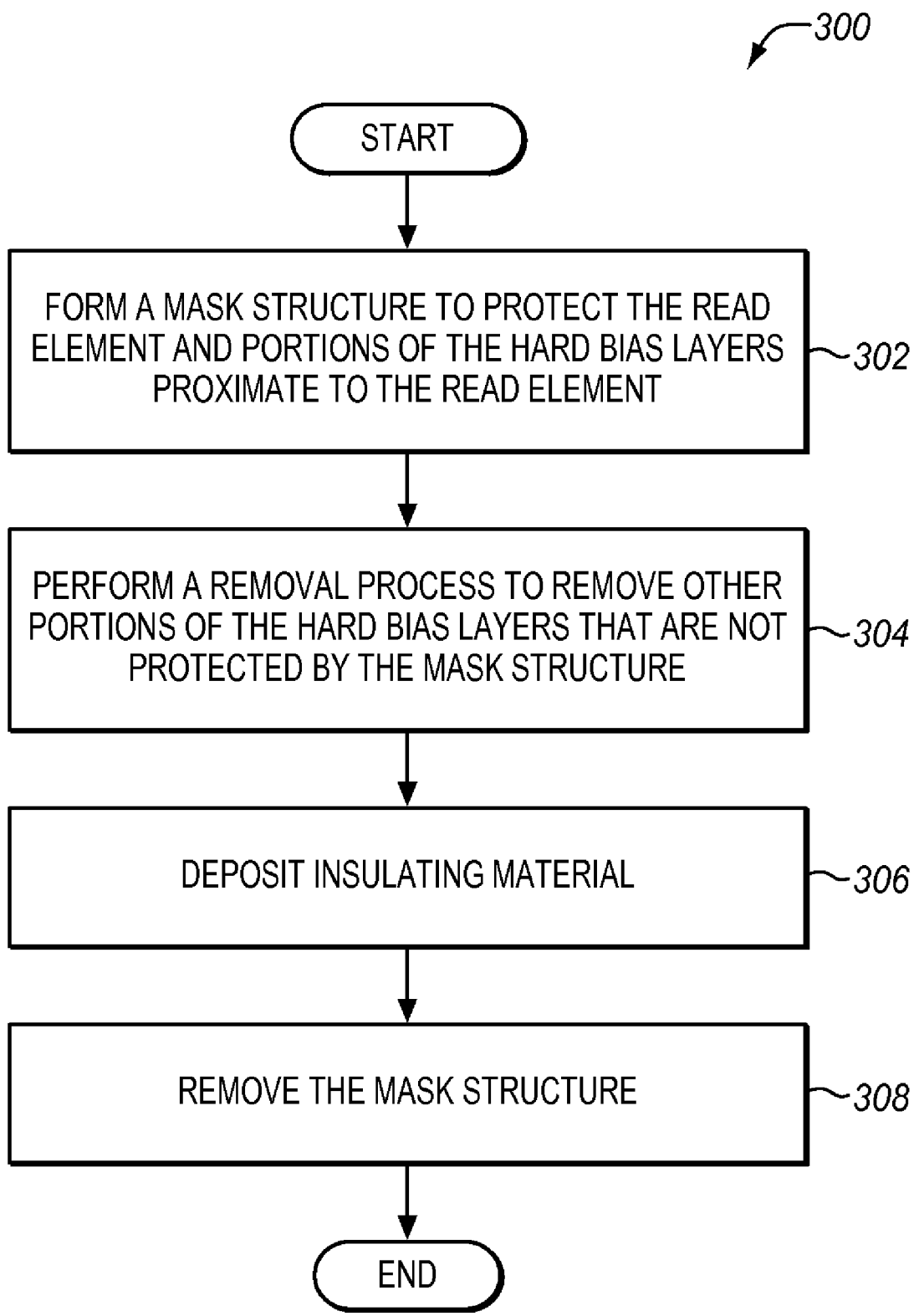
FIG. 3 is a flow chart illustrating a method of fabricating a read head with a reduced scratch exposure region in an exemplary embodiment of the invention.

FIG. 3 is a flow chart illustrating a method 300 of fabricating a read head with a reduced scratch exposure region in an exemplary embodiment of the invention. Method 300 is performed on a read head structure such as shown in FIG. 2, where the read head includes a first shield, a read element formed on the first shield, and hard bias layers formed on either side of the read element. FIGS. 4-7 illustrate a read head 400 formed during fabrication according to method 300 in exemplary embodiments of the invention. The steps of method 300 may not be all-inclusive, and may include other steps not illustrated for the sake of brevity.

Figure 4:
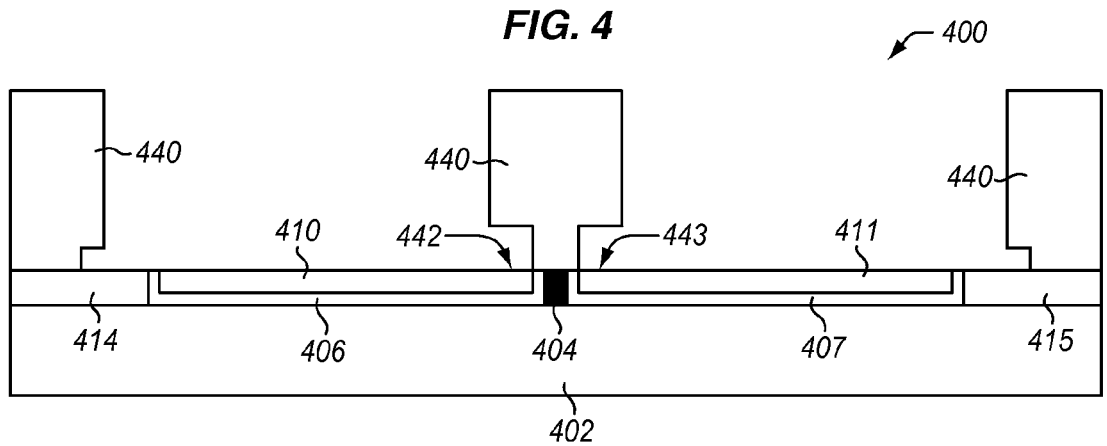
FIGS. 4-7 illustrate a read head formed during fabrication according to the method of FIG. 3 in exemplary embodiments of the invention.

Step 302 of FIG. 3 comprises forming a mask structure to protect the read element and portions of the hard bias layers proximate to the read element. FIG. 4 illustrates a read head 400 with a mask structure 440 formed according to step 302. Read head 400 includes a first shield 402 and a read element 404 formed on the first shield 402. Read head 400 also includes hard bias layers 410-411 that are formed on both sides of read element 404. The hard bias layers 410-411 are separated from read element 404 and the first shield 402 by insulating layers 406-407. Read head 400 also includes refill material 414-415.

According to step 302, mask structure 440 is formed on read element 404 and portions 442-443 of hard bias layers 410-411 that are adjacent to read element 404. Mask structure 440 thus protects read element 404 and the portions 442-443 of hard bias layer 410-411 that are adjacent to read element 404. Mask structure 440 may comprise a photo-resist or any other type of mask or resist. Mask structure 440 may also be a bi-layer structure, such as is illustrated in FIG. 4. Mask structure 440 may be formed to define the practical minimum for the width of hard bias layers 410-411. If the width of hard bias layers 410-411 is below this practical minimum, then they may not provide effective biasing for read element 404.

Figure 5:
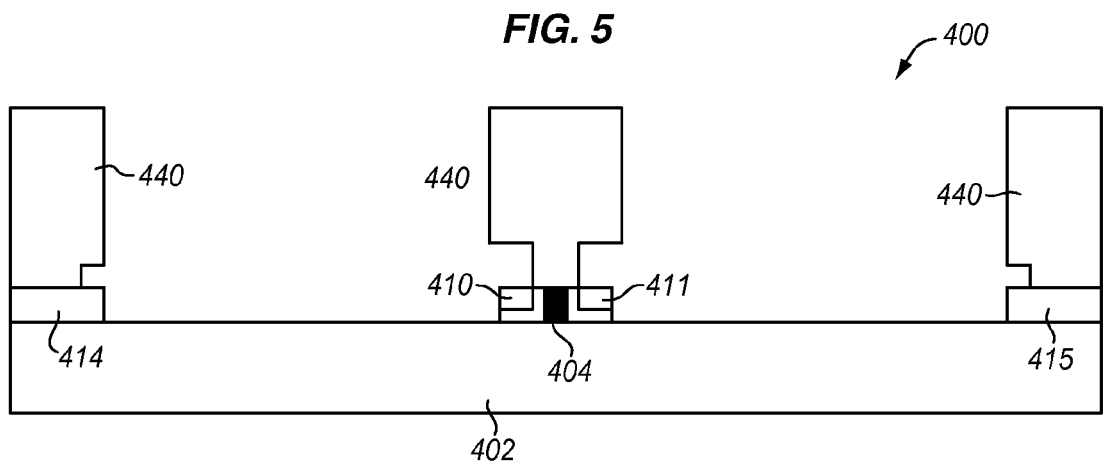

Step 304 comprises performing a removal process to remove other portions of the hard bias layers that are not protected by the mask structure. FIG. 5 illustrates read head 400 after the removal process of step 304. The removal process removes the material not protected by mask structure 440, which is the remaining portion of hard bias layers 410-411 and some insulating material. The removal process may comprise a milling process or some other process.

Figure 6:
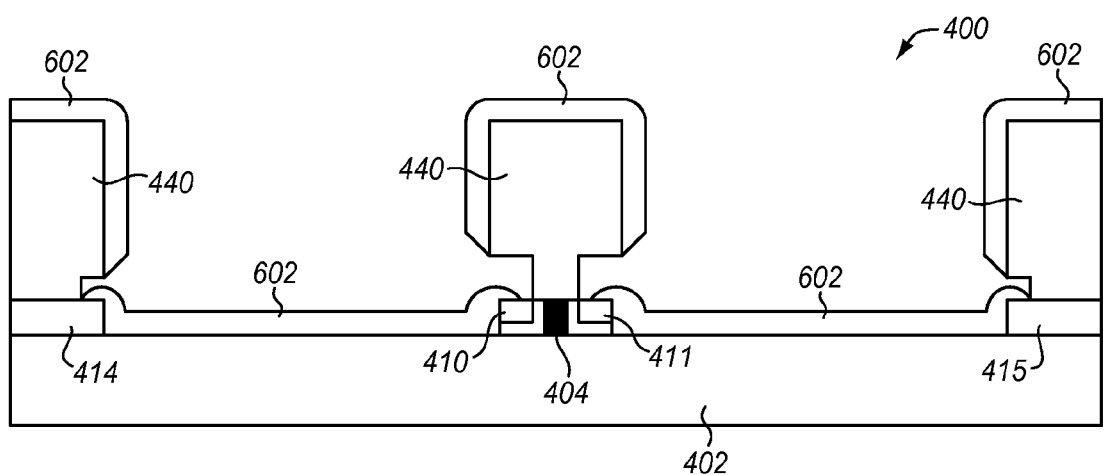

Step 306 comprises depositing insulating material. This is a full film deposition step where insulating material is deposited over the wafer. FIG. 6 illustrates read head 400 with the insulating material 602 deposited as in step 306. Insulating material 602 refills the regions of read head 400 where portions of hard bias layers 410-411 were removed during step 304. Further, insulating material 602 may be formed to a thickness greater than hard bias layers 410-411. For example, a thickness of insulating material 602 may be at least 50 nm. Thus, insulating material 602 is more difficult to scratch across than the removed portions of hard bias layers 410-411 which are electrically conductive.

Figure 7:
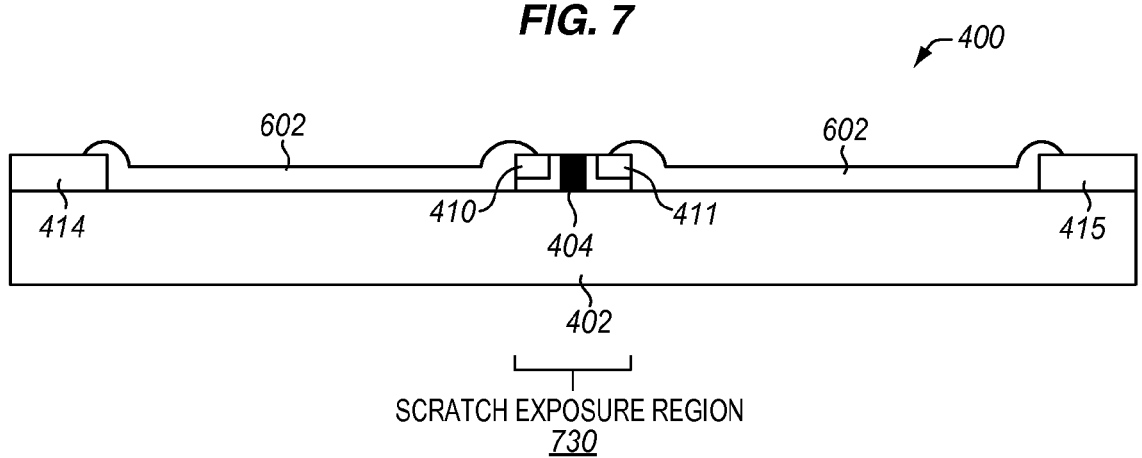

Step 308 comprises removing the mask structure. FIG. 7 illustrates read head 400 with the mask structure removed as in step 308. Read head 400 as fabricated according to method 300 advantageously has a reduced scratch exposure region 730 as compared to read head 100 shown in FIGS. 1-2. Scratch exposure region 730 is essentially the area between shield 402 and the future second shield (not shown) where either hard bias layers 410-411 or read element 404 are formed. Because hard bias layers 410-411 where "trimmed" in step 304, the total area of the scratch exposure region is reduced. Much of the hard bias layers 410-411 were removed and replaced with insulating material 602. Insulating material 602 is more difficult to scratch across, making read head 400 less susceptible to scratching.

Figure 8:
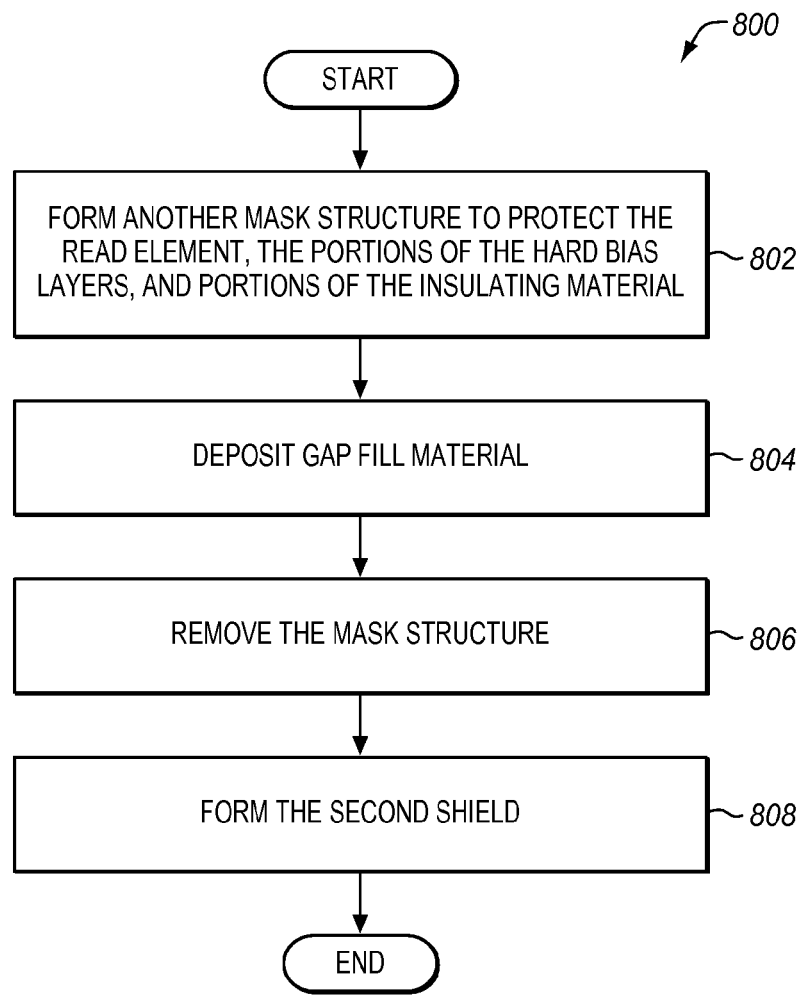
FIG. 8 is a flow chart illustrating a further method of fabricating a read head with a reduced scratch exposure region in an exemplary embodiment of the invention.

FIG. 8 is a flow chart illustrating a further method 800 of fabricating a read head with a reduced scratch exposure region in an exemplary embodiment of the invention. Method 800 is one possible extension of method 300. FIGS. 9-12 illustrate a read head 400 formed during fabrication according to method 800 in exemplary embodiments of the invention. The steps of method 800 may not be all-inclusive, and may include other steps not illustrated for the sake of brevity.

Figure 9:
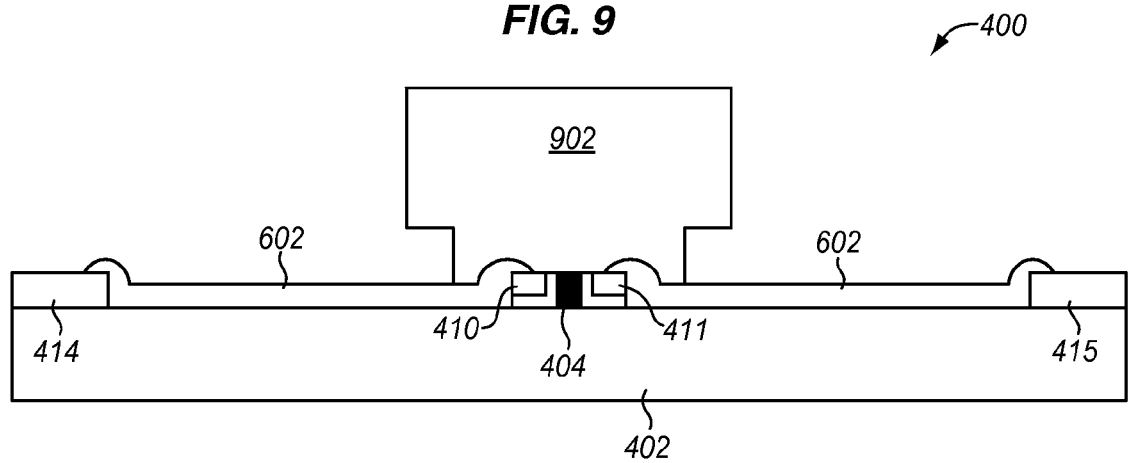
FIGS. 9-12 illustrate a read head formed during fabrication according to the method of FIG. 8 in exemplary embodiments of the invention.

Step 802 comprises forming another mask structure to protect the read element, the first portions of the hard bias layers, and portions of the insulating material proximate to the hard bias layers. FIG. 9 illustrates read head 400 with mask structure 902 formed according to step 802. Mask structure 902 protects read element 404, the remaining hard bias layers 410-411, and portions of insulating material 602 that is proximate to hard bias layers 410-411.

Figure 10:
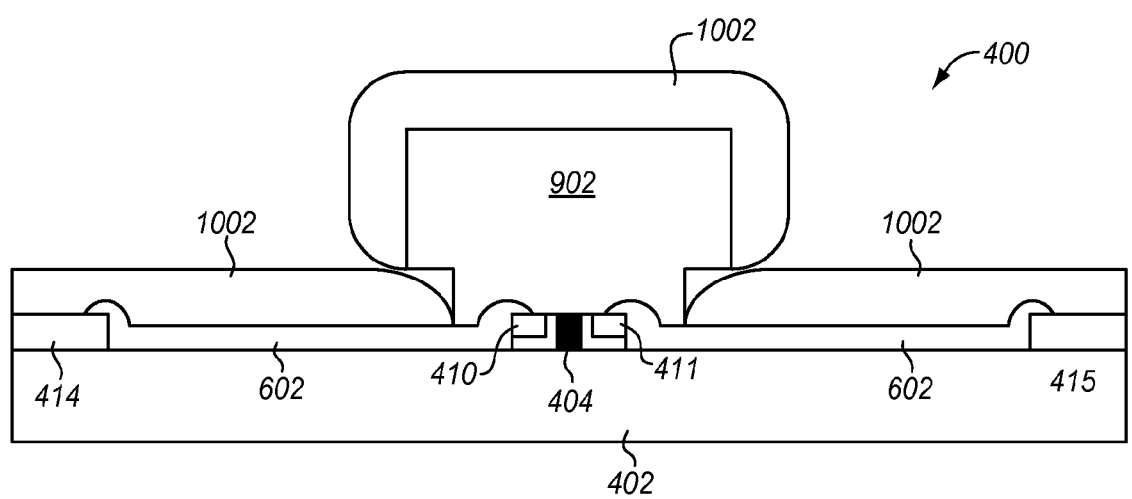

Step 804 comprises depositing gap fill material. This is a full film deposition step where gap fill material, such as alumina, is deposited over the wafer. FIG. 10 illustrates read head 400 with gap fill material 1002 deposited according to step 804.

Figure 11:
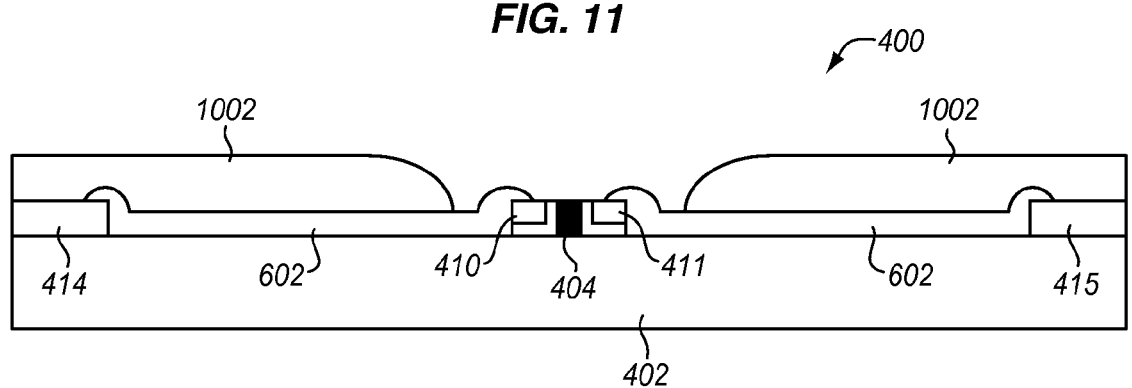
Figure 12:
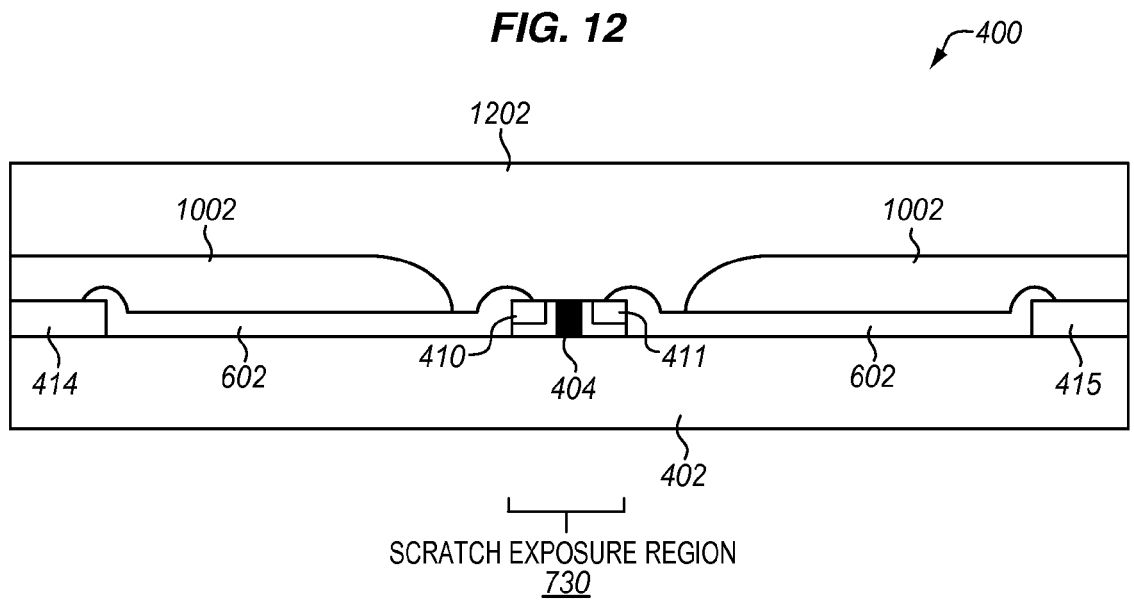

Step 806 comprises removing the mask structure. FIG. 11 illustrates read head 400 with mask structure 902 removed according to step 806. Step 808 comprises forming a second shield for the read head. FIG. 12 illustrates read head 400 with a second shield 1202 formed according to step 808.

The structure of read head 400 as illustrated in FIG. 12 has advantages as compared to a conventional read head as shown in FIG. 1. First, the scratch exposure region 730 of read head 400 is reduced as compared to the scratch exposure region 130 of conventional read head 100. The scratch exposure region 730 of read head 400 is reduced because some of the hard bias layers 410-411 are trimmed leaving only portions that are proximate to the read element 404. The areas formerly populated with the hard bias layers are filled with insulating material and/or gap fill material. Thus, there is less electrically conductive material between the first shield 402 and the second shield 1202 that can be smeared such as to create a short between the shields. The result is that read sensor 400 has less of a probability of experiencing significant performance degradation due to shorting of the first shield 402 to the second shield 1202.

Although specific embodiments were described herein, the scope of the invention is not limited to those specific embodiments. The scope of the invention is defined by the following claims and any equivalents thereof.

We claim:

1. A method of reducing the scratch exposure region of a read head, wherein the read head includes a first shield, a read element formed on the first shield, and hard bias layers formed on side regions of the read element, the method comprising:
   forming a mask structure to protect the read element and first portions of the hard bias layers proximate to the read element;
   performing a removal process to remove second portions of the hard bias layers that are not protected by the mask structure;
   depositing insulating material;
   removing the mask structure;
   forming another mask structure to protect the read element, the first portions of the hard bias layers, and portions of the insulating material proximate to the hard bias layers;
   depositing gap fill material; and
   removing the other mask structure.

2. The method of claim 1 further comprising:
   forming a second shield on the insulating material and the gap fill material.

3. The method of claim 1 wherein a thickness of the insulating material is at least 50 nm.

4. The method of claim 1 wherein the mask structure comprises a bi-layer mask structure.

5. The method of claim 1 wherein performing a removal process comprises:
   performing a milling process to remove the second portions of the hard bias layers that are not protected by the mask structure.

6. A method of fabricating a read head, the method comprising:
   fabricating a read element and hard bias layers on side regions of the read element, wherein the width of the read element and the hard bias layers define an initial scratch exposure region;
   forming a mask structure on the read element and portions of the hard bias layers proximate to the read element;
   performing a removal process to remove portions of the hard bias layers that are not protected by the mask structure, wherein the width of the read element and the remaining hard bias layers define a final scratch exposure region that is smaller than the initial scratch exposure region;
   depositing insulating material;
   removing the mask structure;
   forming another mask structure on the read element, the remaining portions of the hard bias layers, and portions of the insulating material proximate to the hard bias layers;
   depositing gap fill material; and
   removing the other mask structure.

7. The method of claim 6 further comprising:
   forming a second shield on the insulating material and the gap fill material.

8. The method of claim 6 wherein a thickness of the insulating material is at least 50 nm.

9. The method of claim 6 wherein the mask structure comprises a bi-layer mask structure.

10. The method of claim 6 wherein performing a removal process comprises:
    performing a milling process to remove the portions of the hard bias layers that are not protected by the mask structure.

11. A method of fabricating a read head, the method comprising:
    forming a stripe height and a track width of a read element of the recording head;
    forming hard bias layers on side regions of the read element;
    forming a mask structure that protects the read element and portions of the hard bias layers proximate to the read element;
    removing portions of the hard bias layers exposed by the mask structure;
    depositing insulating material;
    removing the mask structure;
    forming another mask structure on the read element, the remaining portions of the hard bias layers, and portions of the insulating material proximate to the hard bias layers;
    depositing gap fill material; and
    removing the other mask structure.

12. The method of claim 11 further comprising:
   forming a second shield on the insulating material and the gap fill material.
13. The method of claim 11 wherein a thickness of the insulating material is at least 50 nm.
14. The method of claim 11 wherein the mask structure comprises a bi-layer mask structure.
15. The method of claim 11 wherein removing portions of the hard bias layers exposed by the mask structure comprises:
   milling the portions of the hard bias layers exposed by the mask structure.

* * * * *

UNITED STATES PATENT AND TRADEMARK OFFICE
CERTIFICATE OF CORRECTION

| | | |
|---|---|---|
| PATENT NO. | : 7,882,618 B2 | Page 1 of 1 |
| APPLICATION NO. | : 11/957468 | |
| DATED | : February 8, 2011 | |
| INVENTOR(S) | : Druist et al. | |

It is certified that error appears in the above-identified patent and that said Letters Patent is hereby corrected as shown below:

In column 3, line 60, the text "skilled in the art how to male" should read "skilled in the art how to make".

Signed and Sealed this
Nineteenth Day of April, 2011

David J. Kappos
*Director of the United States Patent and Trademark Office*